US008639295B2

(12) United States Patent
Hsieh et al.

(10) Patent No.: US 8,639,295 B2
(45) Date of Patent: Jan. 28, 2014

(54) METHOD FOR UNLOCKING SCREEN, MOBILE ELECTRONIC DEVICE USING THE SAME AND STORAGE MEDIUM THEREOF

(75) Inventors: Chin-Ying Hsieh, Taoyuan County (TW); Sih-Jie Gu, Taoyuan County (TW); Drew Bamford, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 706 days.

(21) Appl. No.: 12/351,862

(22) Filed: Jan. 12, 2009

(65) Prior Publication Data
US 2009/0264159 A1 Oct. 22, 2009

(30) Foreign Application Priority Data
Apr. 17, 2008 (TW) ................ 97113963 A

(51) Int. Cl.
*H04M 1/00* (2006.01)
(52) U.S. Cl.
USPC ........... 455/566; 455/411; 715/863; 715/771; 345/156; 345/179; 345/173; 345/1.1; 713/182; 713/156; 713/154
(58) Field of Classification Search
USPC .......... 715/763, 863, 300, 771, 154; 455/566, 455/411; 345/156, 179, 173, 1.1; 713/182, 713/156, 154
See application file for complete search history.

(56) References Cited

U.S. PATENT DOCUMENTS

| | | | | |
|---|---|---|---|---|
| 7,479,949 B2* | 1/2009 | Jobs et al. | ...................... | 345/173 |
| 7,657,849 B2* | 2/2010 | Chaudhri et al. | ............. | 715/863 |
| 7,890,778 B2* | 2/2011 | Jobs et al. | ...................... | 713/300 |
| 8,046,721 B2* | 10/2011 | Chaudhri et al. | ............. | 715/863 |
| 8,127,254 B2* | 2/2012 | Lindberg et al. | ............... | 715/863 |
| 8,209,637 B2* | 6/2012 | Chaudhri et al. | ............. | 715/863 |
| 8,405,621 B2* | 3/2013 | Gehani et al. | ................. | 345/173 |
| 2006/0010400 A1* | 1/2006 | Dehlin et al. | ................. | 715/856 |
| 2006/0026536 A1* | 2/2006 | Hotelling et al. | ............. | 715/863 |
| 2007/0150842 A1* | 6/2007 | Chaudhri et al. | ............. | 715/863 |
| 2008/0201650 A1* | 8/2008 | Lemay et al. | ................. | 715/763 |
| 2009/0006991 A1* | 1/2009 | Lindberg et al. | ............... | 715/763 |
| 2009/0249240 A1* | 10/2009 | Lundy et al. | .................. | 715/771 |
| 2010/0211920 A1* | 8/2010 | Westerman et al. | .......... | 715/863 |
| 2010/0257490 A1* | 10/2010 | Lyon et al. | ..................... | 715/863 |

FOREIGN PATENT DOCUMENTS

| | | |
|---|---|---|
| TW | I270819 | 1/2007 |
| WO | 2007076210 | 7/2007 |

OTHER PUBLICATIONS

"1st Office Action of China Counterpart Application", issued on Sep. 26, 2010, p. 1-p. 11.
"Office Action of Taiwan Counterpart Application", issued on Jul. 11, 2011, p. 1-p. 8.

* cited by examiner

*Primary Examiner* — Junpeng Chen
(74) *Attorney, Agent, or Firm* — Jianq Chyun IP Office

(57) ABSTRACT

A method for unlocking screen, a mobile electronic device using the same and a storage medium thereof are disclosed. First, at least two signal input areas on a touch screen of the mobile electronic device are defined. When an input signal is detected within at least one signal input areas, a moving range of a trajectory produced by the input signal is calculated. And the touch screen is unlocked when the moving range reaches the predetermined value. Thus, the present invention provides a user with more virtual manner to close the screen locking function so as to promote the usage convenience of the mobile electronic device.

24 Claims, 3 Drawing Sheets

METHOD FOR UNLOCKING SCREEN, MOBILE ELECTRONIC DEVICE USING THE SAME AND STORAGE MEDIUM THEREOF

CROSS-REFERENCE TO RELATED APPLICATION

This application claims the priority benefit of Taiwan application serial No. 97113963, filed on Apr. 17, 2008. The entirety of the above-mentioned patent application is hereby incorporated by reference herein and made a part of this specification.

BACKGROUND OF THE INVENTION

1. Field of the Invention

The present invention generally relates to applications of a touch screen, and more particularly, to a method for unlocking screen by using a touch screen, a mobile electronic device using the same and a storage medium thereof.

2. Description of Related Art

Along with the progresses of science and technology, it may not be possible to meet the demands of customers by merely integrating multiple functions into an electronic device. In fact, a fully-functional electronic device must satisfy not only the requirements of compact shape and nice look, but also operation convenience so as to meet the increasing critical demand of customers. Taking a handset widely used around the world today as an example, it used a hardware keyboard as the input interface in the early stage thereof. However, along with the emergence of touch screen, due to many features of a touch screen, such as usage convenience, visual operation, durability and low cost, the handset manufacturers are using a touch screen to replace the traditional hardware keyboard for promoting the operation convenience of handset.

Although a handset using a touch screen for operation is very convenient, but the manufacturers need to develop a new special mechanism used in a handset to prevent a user from accidentally touching the screen to start any unwanted function. In other words, when a user does not operate the handset, the handset would automatically enter a screen locking state, and thereby disable the inputting function of the touch screen. The above-mentioned mechanism is particularly vital when the handset of a user is put in the pocket or the backpack. Once the handset has such a mechanism and the user sets the handset as screen locking state, the user would never worry about accidental touching of the screen, for example, a phone call is accidentally dialled up.

In terms of a smartphone equipped with an embedded Microsoft Windows mobile OS (operation system), an icon showing screen locking state can be illustrated on the host operation frame of the screen, and the user can click the icon to activate the screen locking state. However, after unlocking the screen, the user needs to follow the instruction on the host operation frame to click the icon or item on the screen step by step, so that the smartphone returns back the state for accepting general operations. The above-mentioned unlocking screen scheme takes more operation time. In particular, considering the icon or the item to unlock screen usually is not big, therefore, the user may experience wrongly clicking situations so that the operation of unlocking screen can not be completed quickly.

SUMMARY OF THE INVENTION

Accordingly, the present invention is directed to a method for unlocking screen, which is able to close the locking screen function according to a touching and sliding manipulation on a screen provided by a user so as to increase the convenience of exiting screen locking state.

The present invention is also directed to a mobile electronic device, which is able to provide a more visual manipulation for a user to unlock the touch screen of the mobile electronic device.

To achieve the above-mentioned or other objectives, the present invention provides a method for unlocking screen for disabling screen locking state of a mobile electronic device. The mobile electronic device herein has a touch screen. The method includes: defining at least two signal input areas on the touch screen; calculating a moving range of a trajectory produced by an input signal when the input signal is detected within at least one of the signal input areas; when the moving range reaches a predetermined value, unlocking the touch screen of the mobile electronic device.

In an embodiment of the present invention, when the input signal is detected within at least one of the signal input areas, the step of calculating the moving range of the trajectory produced by the input signal further includes respectively calculating the moving range of a first trajectory produced by a first input signal and the moving range of a second trajectory produced by a second input signal when simultaneously detecting the first input signal and the second input signal within two of the signal input areas.

In an embodiment of the present invention, the moving directions of the first trajectory and second trajectory is identical or opposite.

In an embodiment of the present invention, when the moving range reaches the predetermined value, the step of unlocking the touch screen of the mobile electronic device includes unlocking the touch screen of the mobile electronic device when either the moving range of the first trajectory or the moving range of the second trajectory reaches the predetermined value.

In an embodiment of the present invention, when the moving range reaches the predetermined value, the step of unlocking the touch screen of the mobile electronic device includes unlocking the touch screen of the mobile electronic device when both the moving ranges of the first trajectory and the second trajectory reach the predetermined value.

In an embodiment of the present invention, the method further includes displaying a default image on each of the signal input areas. In another embodiment, when an input signal is detected within at least one of the signal input areas, the default image on the corresponding signal input area is changed.

In an embodiment of the present invention, when an input signal is detected within at least one of the signal input areas, the method further includes displaying a prompt manipulation message on the touch screen.

In an embodiment of the present invention, the moving range includes a horizontal component and a vertical component. When the moving range reaches the predetermined value, the step of unlocking the touch screen includes unlocking the touch screen when the vertical component reaches the predetermined value.

In an embodiment of the present invention, the method further includes splitting the touch screen into a plurality of blocks and taking at least two blocks among the above-mentioned blocks as the signal input areas, wherein the manner of splitting the touch screen into a plurality of blocks includes horizontal splitting, vertical splitting or slanted splitting.

The present invention also provides a mobile electronic device, which includes a touch screen, a moving range calculation module and a processing module, wherein the touch screen includes at least two signal input areas for receiving input signals; the moving range calculation module is connected to the touch screen for calculating the moving range of a trajectory produced by the input signal when the input signal is detected within at least one of the signal input areas; the processing module is connected to the touch screen and the moving range calculation module for unlocking the touch screen of the mobile electronic device when the moving range reaches a predetermined value.

In an embodiment of the present invention, the moving range calculation module is for respectively calculating the moving range of a first trajectory produced by a first input signal and the moving range of a second trajectory produced by a second input signal when simultaneously detecting the first input signal and the second input signal within two of the signal input areas.

In an embodiment of the present invention, the moving directions of the first trajectory and second trajectory is identical or opposite.

In an embodiment of the present invention, the processing module is for unlocking the touch screen of the mobile electronic device when either the moving range of the first trajectory or the moving range of the second trajectory reaches the predetermined value.

In an embodiment of the present invention, the processing module is for unlocking the touch screen of the mobile electronic device when both the moving ranges of the first trajectory and the second trajectory reach the predetermined value.

In an embodiment of the present invention, the processing module is for displaying a default image on each of the signal input areas and changing the default image on the corresponding signal input area when the input signal is detected within at least one of the signal input areas.

In an embodiment of the present invention, the processing module is for displaying a prompt manipulation message on the touch screen when the input signal is detected within at least one of the signal input areas.

In an embodiment of the present invention, the moving range includes a horizontal component and a vertical component. The processing module is for unlocking the touch screen of the mobile electronic device when the vertical component of the moving range reaches the predetermined value.

In an embodiment of the present invention, the processing module is for splitting the touch screen into a plurality of blocks and taking at least two blocks among the above-mentioned blocks as the signal input areas, wherein the processing module is for horizontal splitting, vertical splitting or slanted splitting the touch screen into the above-mentioned blocks.

The present invention further provides a storage medium for storing computer programs. The computer programs include a plurality of program codes to be loaded to the mobile electronic device to make the mobile electronic device execute the above-mentioned procedure of unlocking the touch screen thereof.

The present invention detects input signals produced by touching actions of a user within at least two signal input areas on a touch screen and decides whether or not to unlock the screen locking state of a mobile electronic device according to the moving range of the trajectory produced by the input signal, so as to provide the user with a more visual manner for manipulating the mobile electronic device to promote the usage convenience.

BRIEF DESCRIPTION OF THE DRAWINGS

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

The above-described and other technical descriptions, the features and the functions of the present invention are clearly presented in association of the detail depiction of an embodiment with the accompanying figures.

In order to more clearly disclose present invention, several embodiments are depicted in follows.

Figure 1:
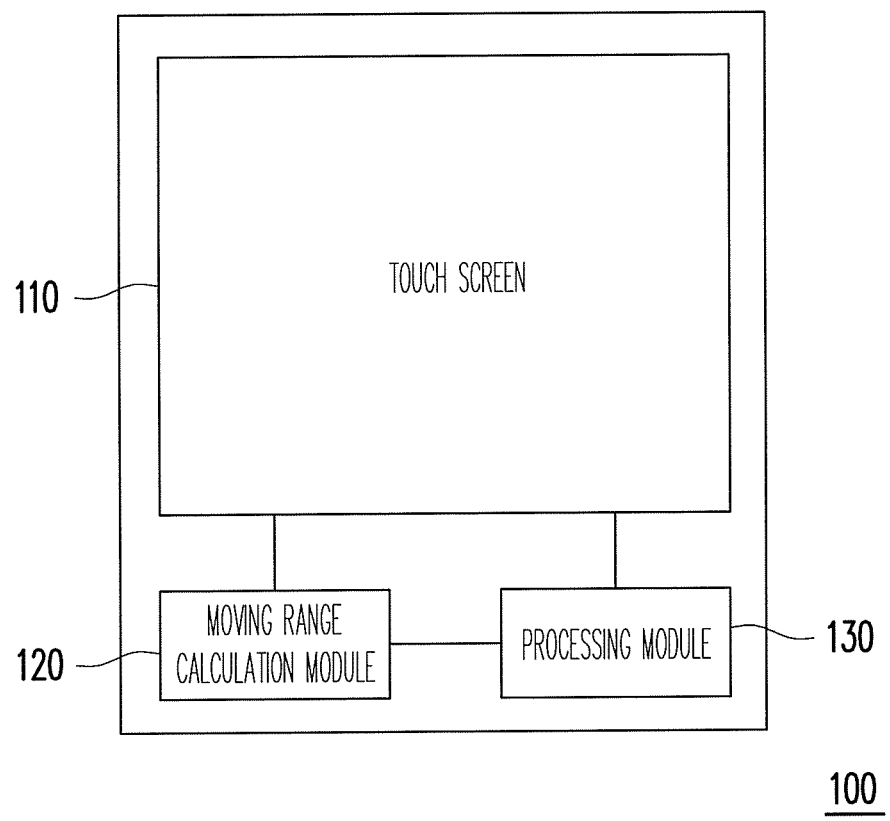
FIG. 1 is a block diagram of a mobile electronic device according to an embodiment of the present invention.

FIG. 1 is a block diagram of a mobile electronic device according to an embodiment of the present invention. In the embodiment, a mobile electronic device 100 herein represents, for example, handset, personal digital assistant (PDA) or smartphone and so on, which the present invention is not limited thereto. Referring to FIG. 1, the mobile electronic device 100 includes a touch screen 110, a moving range calculation module 120 and a processing module 130.

Except for displaying the operation frames of various application programs, the touch screen 110 herein further includes at least two signal input areas, and each of the signal input areas receives an input signal produced by touching actions of a user.

The moving range calculation module 120 is connected to the touch screen 110 for calculating a moving range of a trajectory produced by the input signal when the input signal is detected within one or more of the signal input areas.

The processing module 130 is connected to the touch screen 110 and the processing module 130 is for unlocking a screen locking state of the mobile electronic device 100 when the moving range calculated by the moving range calculation module 120 reaches a predetermined value.

To explain how the mobile electronic device 100 originally in the screen locking state disables the screen locking state through the operations of the touch screen 110, the moving range calculation module 120 and the processing module 130, the following is exemplarily depicted.

Figure 2:
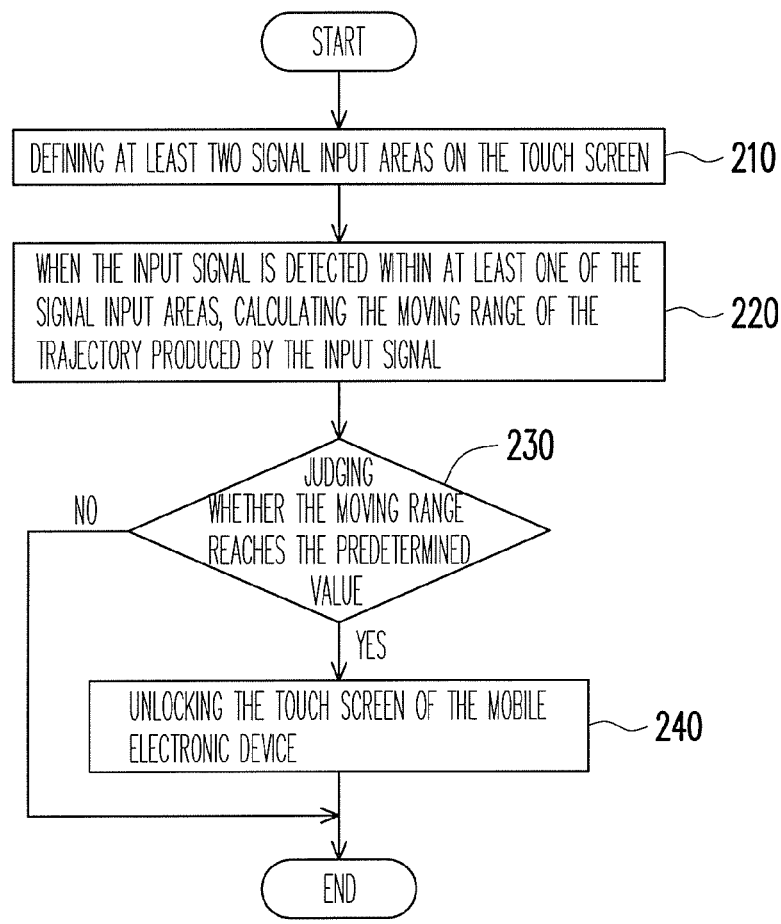
FIG. 2 is a flowchart of the method for unlocking screen according to an embodiment of the present invention.

FIG. 2 is a flowchart of the method for unlocking screen according to an embodiment of the present invention. Referring to FIGS. 1 and 2, first in step 210, the processing module 130 defines signal input areas on the touch screen 110. Specially, the processing module 130 first splits the touch screen 110 into a plurality of blocks. Next, two or more among the above-mentioned blocks are taken as the signal input areas on the touch screen 110 and a default image is displayed on each of the signal input areas.

Figure 3:
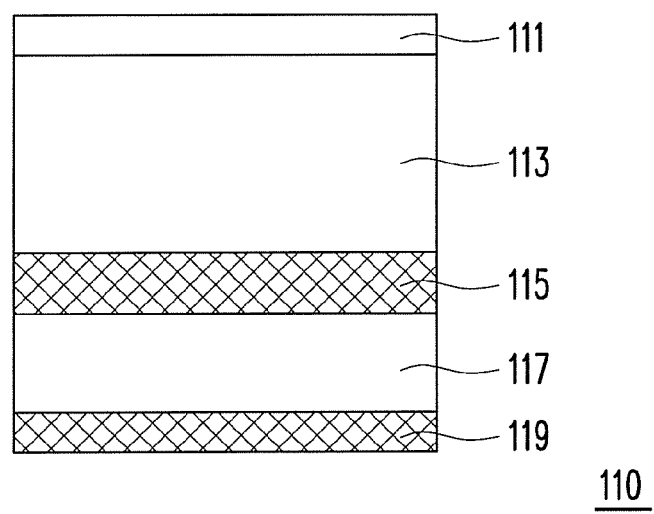
FIG. 3 is a diagram of a touch screen according to an embodiment of the present invention.

In an embodiment, the touch screen 110 split by the processing module 130 is shown by the one of FIG. 3. FIG. 3 is a diagram of a touch screen according to an embodiment of the present invention, referring to FIG. 3, the processing module 130 horizontally cuts the touch screen 110 into five blocks of 111, 113, 115, 117 and 119. Note that except for the horizontally splitting, the processing module 130 can also split the touch screen 110 into a plurality of vertical, horizontal or slanted blocks, which the present invention is not limited thereto. Then, the processing module 130 defines two or more of the blocks among all the split out blocks as the signal input areas. For depiction convenience, it is assumed in the following embodiments the processing module 130 takes the blocks 115 and 119 as the signal input areas.

Then, in step 220 as shown in FIG. 2, the input signal produced by touching actions of the user is detected within at least one of the signal input areas and the moving range calculation module 120 starts calculating the moving range of the trajectory produced by the input signal. As an input signal is detected within the signal input areas, the processing module 130 simultaneously changes the original default image on the signal input areas. In another embodiment however, the processing module 130 displays a prompt manipulation message on the touch screen 110 to remind the user to slide an input tool (for example, finger or touch pen), so that the moving range calculation module 120 is able to start calculating the moving range of the trajectory produced by the input signal.

In step 230, the processing module 130 judges whether or not the moving range reaches the predetermined value. In the embodiment, the moving ranges calculated by the moving range calculation module 120 includes a horizontal component and a vertical component, and the processing module 130 judges whether or not the vertical component of the moving range reaches the predetermined value. If the vertical component of the moving range reaches the predetermined value, as shown by step 240, the processing module 130 would disable the screen locking state of the mobile electronic device 100. In another embodiment however, the horizontal component is taken as the base to judge whether or not the horizontal component exceeds the predetermined value so as to disable or remain the screen locking state, which the present invention is not limited to.

It can be seen from the described above since the processing module 130 defines two signal input areas on the touch screen 110, thus, the user can use an input tool to touch the blocks 115 or 119, or both the blocks 115 and 119, on the touch screen 110 to produce an input signal. When the user moves the input tool to make the moving range reach the predetermined value, the processing module 130 automatically closes the screen locking function of the mobile electronic device 100 so as to allow the user conducts general manipulations on the mobile electronic device 100.

Figure 4:
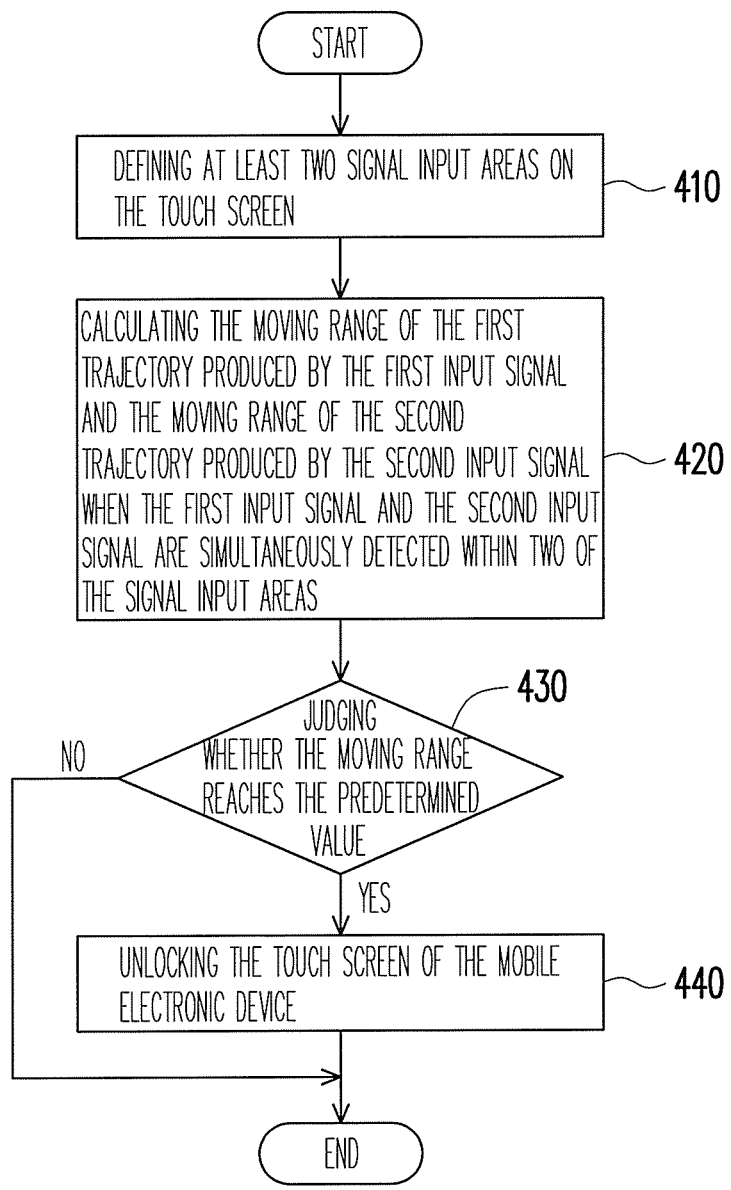
FIG. 4 is a flowchart of the method for unlocking screen according to another embodiment of the present invention.

FIG. 4 is a flowchart of the method for unlocking screen according to another embodiment of the present invention. Referring to FIG. 4, the embodiment is to depict the present invention in more detail by taking the mobile electronic device 100 of FIG. 1 as an example. First, in step 410, the processing module 130 splits the touch screen 110 into a plurality of blocks, the same as the hereinabove embodiment, five blocks 111, 113, 115, 117 and 119 (referring to FIG. 3). Next, two of the above-mentioned blocks 115 and 119 are taken as the signal input areas on the touch screen 110. Note that the present embodiment defines two signal input areas, but which does not indicate the present invention is limited to two signal input areas. In other words, the processing module 130 is allowed to define at least two or more than two signal input areas on the touch screen 110.

Next, in step 420, a first input signal and a second input signal are simultaneously detected within the two signal input areas (the blocks 115 and 119), the moving range calculation module 120 starts respectively calculating the moving range of the first trajectory produced by the first input signal and the moving range of the second trajectory produced by the first input signal, wherein the above-mentioned first trajectory and second trajectory have the same moving directions or two opposite moving directions, which the present invention is not limited to.

In step 430, the processing module 130 judges whether or not the moving range reaches the predetermined value. As shown by step 440, when the moving range reaches the predetermined value, the screen locking state of the mobile electronic device 100 is disabled. In an embodiment, once one of the moving ranges of the first trajectory and the second trajectory reaches the predetermined value, the processing module 130 would disable the screen locking state of the mobile electronic device 100. In other words, the user can use two fingers to simultaneously touch the blocks 115 and 119 on the touch screen 110; once the displacement of one of the fingers on the touch screen 110 reaches the predetermined value, the mobile electronic device 100 would close the screen locking state.

In another embodiment, the processing module 130 would close the screen locking state of the mobile electronic device 100 only both the moving ranges of the first trajectory and the second trajectory reach the predetermined value. In other words, after the user uses two fingers to simultaneously touch the blocks 115 and 119, and the moving ranges produced by the two fingers on the touch screen 110 simultaneously reach the predetermined value, the screen locking state of the mobile electronic device 100 can be disabled.

In the embodiment of FIG. 4, the user is required to use input tools to touch the two signal input areas on the touch screen 110 and then move the input tools so as to have a chance to disable the screen locking state of the mobile electronic device 100, which suggests the threshold to disable the screen locking state is increased. As a result, the user is avoided to accidentally close the screen locking state and the unwanted events of wrong operations are reduced.

Note that the above-described method for unlocking screen can be executed by any mobile electronic device having a processor. The above-mentioned embodiments can be further designed to include a plurality of program codes, and a storage medium readable by a computer (for example, optical disk, diskette and removable hard disk) is used to store the computer program. After loading the computer program to a mobile electronic device, the mobile electronic device can execute the method for unlocking screen as the described above embodiments.

In summary, the method for unlocking screen, the mobile electronic device and the storage medium thereof provided by the present invention through defining two or more than two signal input areas on the touch screen and detecting an input signal within the at least one signal input area so as to calculate the moving range of the trajectory of the input signal. The present invention decides whether or not to disable the screen locking state of the mobile electronic device according to whether or not the moving range reaches the predetermined value, and thereby provides the user with a more varied scheme to close the screen locking function.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method for unlocking screen to disable a screen locking state of a mobile electronic device, wherein the mobile electronic device has a touch screen; the method comprising:
   detecting a first touch input and a second touch input simultaneously on the touch screen;
   calculating a displacement of a first trajectory produced by the non-linear movement of the first touch input after the first touch input is detected within a first predefined input area on the touch screen;
   calculating a displacement of a second trajectory produced by the non-linear movement of the second touch input after the second touch input is detected within a second predefined input area on the touch screen, wherein the first predefined input area is different from the second predefined input area; and
   unlocking the touch screen of the mobile electronic device when the displacement of the first trajectory and the displacement of the second trajectory both reach a predetermined value.

2. The method for unlocking screen according to claim 1, wherein the first trajectory and the second trajectory have an identical moving direction substantially.

3. The method for unlocking screen according to claim 1, wherein the first trajectory and second trajectory respectively have an opposite moving direction substantially.

4. The method for unlocking screen according to claim 1, further comprising:
   displaying a default image on each of the first and second predefined input areas.

5. The method for unlocking screen according to claim 4, further comprising:
   changing the default image on the corresponding predefined input area when the touch input is detected within at least one of the first and second predefined input areas.

6. The method for unlocking screen according to claim 1, wherein the step of unlocking the touch screen of the mobile electronic device when the displacement of both the first trajectory and the second trajectory respectively produced by the first touch input and the second touch input reach the predetermined value comprises:
   unlocking the touch screen of the mobile electronic device when vertical components of the displacement of both the first trajectory and the second trajectory reach the predetermined value.

7. The method of claim 1, wherein the first predefined input area is not adjacent to the second predefined input area.

8. The method for unlocking screen according to claim 1, wherein the first predefined input area and the second predefined input area are both rectangular having a length longer than a width, and the step of unlocking the touch screen of the mobile electronic device further comprises:
   unlocking the touch screen of the mobile electronic device when the first touch input moves through the length of the first predefined input area.

9. The method for unlocking screen according to claim 1, wherein the first predefined input area and the second predefined input area are both rectangular having a length longer than a width, and the step of unlocking the touch screen of the mobile electronic device further comprises:
   unlocking the touch screen of the mobile electronic device when the first touch input moves through the length of the first predefined input area and the second touch input moves through the length of the second predefined input area.

10. The method for unlocking screen according to claim 1, wherein the step of unlocking the touch screen of the mobile electronic device when the displacement of both the first trajectory and the second trajectory respectively produced by the first touch input and the second touch input reach the predetermined value comprises:
    unlocking the touch screen of the mobile electronic device when horizontal components of the displacement of both the first trajectory and the second trajectory reach the predetermined value.

11. The method for unlocking screen according to claim 1, further comprising:
    displaying a prompt manipulation message on the touch screen when the first or the second touch input is detected within at least one of the first and second predefined input areas.

12. A mobile electronic device, comprising:
    a touch screen, comprising a first predefined input area and a second predefined input area for receiving a first touch input and a second touch input simultaneously to unlock the mobile electronic device, wherein the first predefined input area is different from the second predefined input area;
    a displacement calculation module, connected to the touch screen for calculating a displacement of a first trajectory produced by the non-linear movement of the first touch input after the first touch input is detected within the first predefined input area, and for calculating a displacement of a second trajectory produced by the non-linear movement of the second touch input after the second touch input is detected within the second predefined input area; and
    a processing module, connected to the touch screen and the displacement calculation module for exiting a screen locking state of the mobile electronic device when the displacement of the first trajectory and the displacement of the second trajectory both reaches a predetermined value.

13. The mobile electronic device according to claim 12, wherein the first trajectory and the second trajectory have an identical moving direction substantially.

14. The mobile electronic device according to claim 12, wherein the first trajectory and second trajectory respectively have an opposite moving direction substantially.

15. The mobile electronic device according to claim 12, wherein the processing module is for changing a default image on the corresponding predefined input area when the first or the second touch input is detected within at least one of the first and second predefined input areas.

16. The mobile electronic device according to claim 12, wherein the processing module is for displaying a prompt manipulation message on the touch screen when the first or the second touch input is detected within at least one of the first and second predefined input areas.

17. The mobile electronic device according to claim 12, wherein the processing module is for unlocking the touch screen of the mobile electronic device when vertical components of the displacement of both the first trajectory and the second trajectory reach the predetermined value.

18. The mobile electronic device of claim 12, wherein the first touch input area is not adjacent to the second touch input area.

19. The mobile electronic device according to claim 12, wherein the first touch input area and the second touch input area are both rectangular having a length longer than a width, and the processing module is further configured for:
    unlocking the touch screen of the mobile electronic device when the first touch input moves through the length of the first touch input area.

20. The mobile electronic device according to claim 12, wherein the first touch input area and the second touch input area are both rectangular having a length longer than a width, and the, and the processing module is further configured for:
    unlocking the touch screen of the mobile electronic device when the first touch input moves through the length of the first touch input area and the second touch input moves through the length of the second touch input area.

21. The mobile electronic device according to claim 12, wherein the processing module is for unlocking the touch screen of the mobile electronic device when horizontal components of the displacement of both the first trajectory and the second trajectory reach the predetermined value.

22. A non-transitory computer storage medium containing recorded programming codes readable by an electronic device to executing the following steps comprising:
    detecting a first touch input and a second touch input simultaneously on the touch screen;
    calculating a displacement of a first trajectory produced by the non-linear movement of the first touch input after the first touch input is detected within a first predefined input area on the touch screen;
    calculating a displacement of a second trajectory produced by the non-linear movement of the second touch input after the second touch input is detected within a second predefined input area on the touch screen, wherein the first predefined input area is different from the second predefined input area; and
    unlocking the touch screen of the mobile electronic device when the displacement of the first trajectory and the displacement of the second trajectory both reach a predetermined value.

23. The non-transitory computer storage medium according to claim 22, wherein the first touch input area is not adjacent to the second touch input area.

24. The non-transitory computer storage medium according to claim 22, wherein the first touch input area and the second touch input area are both rectangular having a length longer than a width, and the step of unlocking the touch screen of the mobile electronic device further comprises:
    unlocking the touch screen of the mobile electronic device when the first touch input moves through the length of the first touch input area.

\* \* \* \* \*